United States Patent [19]

Levine

[11] Patent Number: 4,562,473
[45] Date of Patent: Dec. 31, 1985

[54] DARK CURRENT SENSING WITH A SOLID-STATE IMAGER HAVING A CCD LINE REGISTER OUTPUT

[75] Inventor: Peter A. Levine, Trenton, N.J.

[73] Assignee: RCA Corporation, Princeton, N.J.

[21] Appl. No.: 659,460

[22] Filed: Oct. 10, 1984

[51] Int. Cl.[4] .............................................. H04N 3/14
[52] U.S. Cl. ..................................... 358/213; 357/24
[58] Field of Search ............... 358/213, 212, 167, 211, 358/221, 163; 357/24 LR

[56] References Cited

U.S. PATENT DOCUMENTS 4,492,980  1/1985  Harada ................................. 358/213
4,496,982  1/1985  Levine ........................... 357/24 LR
4,498,105  2/1985  Crawshaw ........................... 358/213
4,525,743  6/1985  Wood, Jr. et al. .................. 358/221

Primary Examiner—Gene Z. Rubinson
Assistant Examiner—Stephen Brinich
Attorney, Agent, or Firm—Joseph S. Tripoli; George E. Haas; Allen L. Limberg

[57] ABSTRACT

Dark current generation in a field-transfer type CCD imager is measured by integrating the response to charge packets supplied from its output register during certain portions of field retrace intervals. During these portions of the field retrace intervals the output register is dynamically clocked to transfer charge packets therefrom although the output register is cleared of externally generated charge. Accordingly, these charge packets originate from the accumulation of dark current arising in the C register.

6 Claims, 1 Drawing Figure

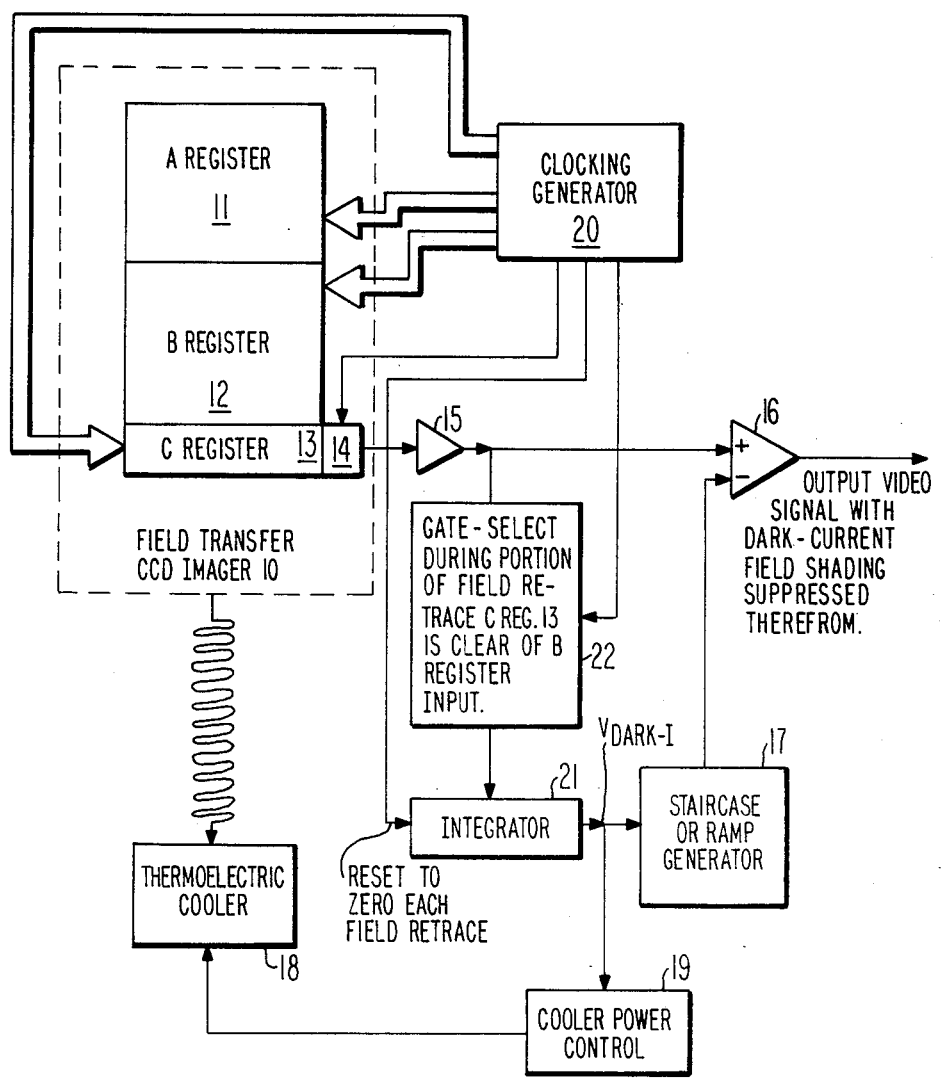

DARK CURRENT SENSING WITH A SOLID-STATE IMAGER HAVING A CCD LINE REGISTER OUTPUT

The presentation relates to sensing dark current in solid-state imagers.

BACKGROUND OF THE INVENTION

The general problem of dark current field shading in CCD imagers of field transfer type and provisions for compensating against this undesirable effect are described in U.S. Pat. No. 4,496,982 issued Jan. 29, 1985 by P. A. Levine, entitled "Compensation Against Field Shading in Video from Field-transfer CCD Imagers", assigned to RCA Corporation, and is incorporated herein by reference. Field shading is a variation in black level across the field in the direction of line advance. It is caused by successive lines of charge packets representative of image samples spending progressively longer periods of time in the field storage register of a field-transfer type of CCD imager. The increased length of time each line of charge packets spends in the field storage (or B) register allows a longer time for the accumulation of dark current and thereby shifts the black level for each successive line further towards white. Field shading is superposed on an optical black, dark current pedestal attributable to the accumulation of dark current in the image (or A) register and in the output line (or C) register.

The rate of dark current accumulation increases with increased temperature of the semiconductive substrate on which the imager is formed. It is desirable to develop a reference voltage that is proportional to dark current accumulated during field trace in the CCD imager, from which signals to compensate against field shading can be developed that provide good compensation despite changes in substrate temperature. Such a reference voltage is more likely to provide good compensation without need for readjustment if it is derived as a direct measure of an accumulation of dark current in an area of the same substrate as that the imager itself is constructed upon. The temperature-sensitive reference voltage can also be used to control cooling of the CCD imager to maintain dark current levels constant as described by P. A. Levine in U.S. patent application Ser. No. 571,719, filed Jan. 18, 1984, entitled "Dark Current Level Regulation in Solid-state Devices" and assigned to RCA Corporation.

The integral of remnant charge left in the field storage register after field trace can, as described in U.S. Pat. No. 4,496,982, be removed during field retrace and Riemann integrated over time to develop a reference voltage that is a measure of dark current accumulation during imager field-trace. The area of the substrate over which remnant charge in accumulated is that of the field storage register, so the sensitivity of the measure of dark current accumulation is good. The practical problem that one runs into in practicing this method is that the opaque mask over the field storage and output line registers used to shield them from illumination does not, at least in imagers presently commercially available, adequately preclude light from the rows of the masked field storage register close to the unmasked image register. The admission of this light causes photoresponse in these rows of the field storage register. This photoresponse is clocked forward during the line-by-line advance of the charge packets through the field storage register in the field trace interval, thence to appear in every line of remnant charge clocked out of the field storage register during field retrace interval.

In color television cameras, where gamma-correction is used, small video variations close to black level are stretched about five times respective to video variations in brighter portions of the televised scene. The photoresponse adulterates to an unacceptable extent the measurement of accumulated dark current made by integrating remnant dark currents removed from the B register during field retrace. Even apparatus for suppressing photoresponse in remnant dark current from the field storage register, by taking a slope measurement thereof, does not provide an accumulated dark current measurement sufficiently free of photoresponse. Such apparatus has been described by R. F. Wood, Jr., J. F. Monahan and P. A. Levine in U.S. Pat. No. 4,525,743 issued June 25, 1985; entitled "Dark Current Measurement and Control for Cameras Having Field-transfer CCD Imagers" and assigned to RCA Corporation.

SUMMARY OF THE INVENTION

A measurement of dark current accumulation in the video output samples supplied by a field-transfer type of CCD imager during field trace times, which measurement is essentially free of photoresponse, can be obtained from the output line register during portions of the field retrace times other than those in which charge transferal is made from the image register to the field storage register. The field retrace interval for broadcast television is twenty lines long, and a time interval of about half this number of lines is used for transferring charge from the image register to the field storage register. So the input line register can be scanned ten times at normal line scan rates to supply accumulated dark current therefrom, supposing that this register is used to clear remnant charge displaced from the field storage register during transferal in of charge packets from the image register. If the displaced remnant charge in the field storage register is forced to pile up in its last row, instead of being cleared out through the output line register, the output line register can read out accumulated dark current over the full twenty line scan periods. In either case the amount of accumulated dark current that is read out in one field suffices to establish a dark current reference voltage.

BRIEF DESCRIPTION OF THE DRAWING

The sole FIGURE is a block diagram of a television camera using improved dark current sensing in accordance with the invention.

DETAILED DESCRIPTION OF THE DRAWING

A field-transfer type of CCD imager 10 comprises an image (or A) register 11, a field storage (or B) register 12, an output line (or C) register 13, and a charge sensor output stage 14 which typically comprises a floating-element in C register 13 charge transfer channel and a field-effect-transistor electrometer. Charge sensor output stage 14 supplies an output signal in voltage form, which is customarily amplified in a low-noise voltage amplifier 15. Amplifier 15 customarily has some low-pass filtering included therein to convert the output video signal supplied from imager 10 in analog sampled-data format to a continuous analog output signal. The B register 12 and C register 13 are shielded from illumination; and a portion of the A register 11 next to B register 12 may also be shielded from illumination, to forestall photogeneration of charge in B register 12. Most of A register 11 is exposed to illumination, typically by imaging light reflected from a scene to be televised on the A register 11 by camera optics not shown in the drawing.

Where dark-current field shading is suppressed, as taught in U.S. Pat. No. 4,496,982 voltage amplifier 15 is followed by a differential-input amplifier 16 or similar means for subtracting a dark-current shading compensation signal from voltage amplifier 15 output response. The dark-current shading compensation signal comprises a ramp voltage or a staircase voltage supplied from a generator 17, the amplitude of the ramp or staircase voltage being controlled as a function of a dark-current reference voltage, $V_{DARK-I}$.

Where the level of dark current accompanying output video signal is to be reduced by cooling imager 10 with an electrically controlled cooler, as taught in U.S. patent application Ser. No. 571,719, filed Jan. 18, 1984, $V_{DARK-I}$ can be used to regulate the degree of cooling provided the imager 10. The drawing indicates the withdrawal of heat from imager 10 by a thermoelectric cooler 18, the power supplied to the cooler being regulated responsive to $V_{DARK-I}$ by cooler power control circuitry 19. Cooling is increased as $V_{DARK-I}$ indicates a tendency for increase in dark current.

A clocking generator 20 supplies static clock signal to A register 11 during field trace intervals and a portion of the intervening field retrace intervals. These intervals when static clock signal is supplied to the A register 11 are termed "image integration times", since if the camera is unshuttered so as to allow illumination of A register 11 by an image, photoresponse to elements of the image will be accumulated in storage wells induced in the parallelled charge transfer channels of A register 11. The accumulation of charge when static clock signal is applied is an integration process.

During a portion of each field retrace interval, clocking generator 20 supplies dynamic clocking signals to A register 11 and to B register 12 in synchronism, to cause the charge packets accumulated in the parallelled charge transfer channels of A register 11 to transfer into the parallelled charge transfer channels of B register 12. These charge packets are descriptive of a field of image element samples, and they replace remnant charge samples advanced forward in B register 12 before their advance into B register 12. C register 13 typically receives dynamic clocking signal throughout A-register-to-B-register charge transfer to remove the remnant charge from B register 12.

During the following field retrace interval, while clocking generator 20 supplies a static clocking signal to A register 11, generator 20 supplies clocking signals to B register 12 and to C register 13 as follows. B register 2 receives dynamic clocking signals that will, during line retrace, advance the charge packets descriptive of image samples forward a charge transfer stage at a time in each of its charge transfer channels, a final line of these charge packets transferring from B register 12 to load respective charge transfer stages of C register 13 in parallel. C register 13 receives a static clocking signal from generator 20 during this parallel transfer of charge packets from B register 12 during line retrace. Then, during the following line trace interval, clocking generator 20 applies a dynamic clocking signal to C register 13 to clock out these charge packets serially at image element scan rate from an end of C register 13 to charge sensor output stage 14. That is, C register 13 is operated as a shift register. Presuming charge sensor output stage 14 to be a floating-element electrometer, clocking generator 20 supplies reset pulses to the electrometer to clamp the floating element to a defined reset drain potential following each image sample being sensed.

The operation of CCD imager 10 as thusfar described is in accordance with previous invention. The present invention concerns the means by which the dark-current reference voltage $V_{DARK-I}$ is developed. $V_{DARK-I}$ is developed as response to the integral of dark-current accumulation in C register 13 during times it is clear of charge packets admitted thereinto from B register 12.

The drawing shows this being done by clock generator 20 applying voltage amplifier 15 response as an input signal to an integrator 21 via a selection gate 22, during the times C register 13 is clear of charge packets admitted thereinto from B register 12 and continues to be dynamically clocked. Voltage amplifier 15 response is proportional to the accumulated dark current charge packets transferred from C register 13 to charge sensor stage 14 during this time, and these charge packets have no photoresponse components in them. Integrator 21 generates a $V_{DARK-I}$ during each field retrace and maintains it through the following field trace interval. Integrator 21 is reset to a zero accumulated dark current indication at the close of the following field trace, prior to gate-selection by selection gate 22 in the next field retrace interval. Although not shown in the drawing integrator 21 may be followed by a low-pass filter to smooth $V_{DARK-I}$ signal so as to be more substantially direct in nature.

C register 13 clocking during gate-selection by selection gate 22 may be similar to its clocking during field trace. However, as long as substantially all the dark current accumulated in C register 13 during the time it is clear of charge packets admitted from B register 12 is transmitted to integrator 21, it is immaterial to what degree the dark current is accumulated in C register 13 before transmission to integrator 21. One skilled in the art and acquainted with this disclosure will readily appreciate that a wide variety of C register 13 clocking and selection-gate 22 timing are possible, and these are all considered within the scope of the invention.

The integration of dark current charge packets can be carried out using output stage 14 where it is of floating-diffusion type. During the time C register 13 is cleared of charge packets representative of image samples and continues to be forward-clocked to advance charge packets representative of dark current accumulation, reset pulses can be withheld from output stage 14 forcing charge to integrate under the floating diffusion. Selection gate 22 and integrator 21 may be replaced by a sample-and-hold circuit to sample the response to this integrated charge and hold the sample throughout the ensuing field trace interval. This arrangement is considered within the scope of the invention, also.

Further, the conventional field-transfer CCD imager 10 may be modified to include a transfer gate between the B register 12 and C register 13, to hold back the parallel loading of the charge transfer stages of C register 13 during A-register-to-B-register charge transfer. The remnant charge advanced in B register 12 will then accumulate in its final rows and can be overflowed to drain structures explicitly for this purpose. This will double the amount of time dark current free of photoresponse can be accumulated from C register 13. The piled up remnant charge in the last row of the B register 12 can then be removed at the outset of field trace, like a normal line of image samples, and discarded. Such modifications are also to be regarded as within the scope of the invention.

The television camera of the sole figure of the drawing can be modified to reset integrator 21 not at the close of each field retrace time, but on every $n^{th}$ field retrace, where n is a positive integer greater than one. The integrator 21 has its output signal sampled just prior to being reset, and this sample is held through the next n field trace times to provide a $V_{DARK-J}$ which is n times as large as that provided by the camera without this modification. This type of modification is to be regarded as within the scope of the invention.

In broader terms the invention maybe embodied in any solid-state imager employing a line register readout, such as an interline transfer type of CCD imager, or such as certain MOS imagers.

What is claimed is:

1. A television camera for generating a video output signal having time-interleaved field trace and field retrace intervals, said television camera comprising:
   a CCD imager of field-transfer type;
   a CCD image register within said CCD imager, said image register having a plurality of charge transfer channels exposed to illumination during at least portions of said field trace intervals for accumulating packets of photogenerated charge as samples of an image;
   a CCD field storage register within said CCD imager, said field storage register having a plurality of charge transfer channels shielded from illumination for receiving, during portions of said field retrace intervals, charge packets accumulated in said image register during preceding field trace intervals;
   a CCD line register included within said CCD imager, for receiving in respective charge transfer stages thereof charge packets from respective charge transfer channels of said field storage register during line retrace intervals in said field trace intervals, for serially supplying during line trace intervals time-interleaved with said line retrace intervals in said field trace intervals the charge packets received during the preceding line retrace interval, and for serially supplying charge packets of accumulated dark current free from photogenerated charge during predetermined portions of field retrace intervals;
   a charge sensor stage within said CCD imager for converting charge packets serially supplied from said line register to respective samples of said video output signal; and
   an integrator responsive to video output signal samples supplied from said charge sensor stage in response to said charge sensor receiving from said line register the charge packets of accumulated dark current free from photogenerated charge during each of said predetermined portions of field retrace intervals, for developing a dark-current reference signal.

2. A television camera as set forth in claim 1 including:
   a thermoelectric cooler for cooling said CCD imager in controlled amount; and
   control circuitry responsive to said dark-current reference signal tending to increase, for increasing the cooling said thermoelectric cooler provides to said CCD imager.

3. A television camera as set forth in claim 1 including:
   means for generating a dark current compensation signal having an amplitude directly dependent on said dark-current reference signal; and
   means for combining said dark current compensation signal with the response to samples of video output signal supplied from said charge sensor stage to generate a video output signal in which dark-current field shading is suppressed.

4. A television camera for generating a video output signal having time-interleaved field trace and field retrace intervals, said television camera comprising:
   a solid state imager;
   an area-type image sensor included within said imager exposed to illumination during at least portions of said field trace intervals for accumulating packets of photogenerated charge as samples of an image;
   means included within said imager, responsive to charge packets accumulated during each field trace interval, for supplying those charge packets a line at a time during line retrace intervals in said field trace intervals;
   a CCD line register included within said imager, for receiving in respective charge transfer stages thereof respective ones of the line of charge packets thus supplied during said line retrace intervals, for serially supplying during line trace intervals time-interleaved with said line retrace intervals in said field trace intervals the charge packets received during the preceding line retrace interval, and for serially supplying charge packets of accumulated dark current free from photogenerated charge during predetermined portions of field retrace intervals;
   a charge sensor stage within said CCD imager for converting charge packets serially supplied from said line register to respective samples of said video output signal; and
   an integrator responsive to video output signal samples supplied from said charge sensor stage responsive to its receiving from said line register the charge packets of accumulated dark current free from photogenerated charge during each of said predetermined portions of field retrace intervals, for developing a dark-current reference signal.

5. A television camera as set forth in claim 4 including:
   a thermoelectric cooler for cooling said CCD imager in controlled amount; and
   control circuitry, responsive to said darkcurrent reference signal tending to increase, for increasing the cooling said thermoelectric cooler provides to said CCD imager.

6. A television camera as set forth in claim 4 including:
   means for generating a dark current compensation signal having an amplitude directly dependent on said dark-current reference signal; and
   means for combining said dark current compensation signal with the response to samples of video output signal supplied from said charge sensor stage to generate a video output signal in which dark-current component is suppressed.

* * * * *